United States Patent
Mataigne et al.

(10) Patent No.: US 10,041,162 B2
(45) Date of Patent: Aug. 7, 2018

(54) METAL SHEET WITH A ZNAL COATING

(71) Applicant: ARCELORMITTAL INVESTIGACIÓN Y DESARROLLO, S.L., Sestao Bizkaia (ES)

(72) Inventors: Jean-Michel Mataigne, Senlis (FR); Didier Dauchelle, Creil (FR); Florence Bertrand, Scy Chazelles (FR)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 14/442,955

(22) PCT Filed: Feb. 10, 2014

(86) PCT No.: PCT/IB2014/058879
§ 371 (c)(1),
(2) Date: May 14, 2015

(87) PCT Pub. No.: WO2014/135999
PCT Pub. Date: Sep. 12, 2014

(65) Prior Publication Data
US 2015/0292072 A1 Oct. 15, 2015

(30) Foreign Application Priority Data

Mar. 6, 2013 (WO) ................. PCT/FR2013/050479

(51) Int. Cl.
*C23C 2/06* (2006.01)
*C23C 2/34* (2006.01)
(Continued)

(52) U.S. Cl.
CPC .............. *C23C 2/06* (2013.01); *B32B 15/013* (2013.01); *B32B 15/04* (2013.01); *B32B 15/043* (2013.01);
(Continued)

(58) Field of Classification Search
CPC .... C23C 2/06; C23C 2/20; C23C 2/26; C23C 2/34; C23C 2/02; C23C 2/16; C23C 2/40;
(Continued)

(56) References Cited

U.S. PATENT DOCUMENTS 5,518,772 A * 5/1996 Andachi ................... C23C 2/20
427/348
8,785,000 B2 7/2014 Maalman et al.
(Continued)

FOREIGN PATENT DOCUMENTS

EP 0 882 810 A2 9/1998
EP 2119804 A1 11/2009
(Continued)

OTHER PUBLICATIONS

Deutscher O. et al: "Characterising the surface waviness of hot dip galvanised steel sheets for optical high-quality paintability (Carsteel)," European Commission, Directorate-General for Research, 2009, pp. 1-133, XP002717503, ISSN: 1018-5593, DOI: 10.2777/65928, ISBN: 978-92-79-11303-1.
(Continued)

*Primary Examiner* — Michael Eugene La Villa
(74) *Attorney, Agent, or Firm* — Davidson, Davidson & Kappel, LLC

(57) ABSTRACT

The present invention provides a method for manufacturing a metal sheet. In this method, at least one of the following equations is satisfied:

$$\frac{Z}{d} + 18\ln\left(\frac{Z}{d}\right) < 8\ln\left(\frac{P}{V}\right) - 27.52 \qquad (A)$$

(Continued)

-continued $$fO_2 < \frac{2.304 \cdot 10^{-3}}{\left(27.52 + \frac{Z}{d} + 8\ln\left(\frac{V}{P}\left(\frac{Z}{d}\right)^{2.25}\right)\right)^2} \quad (B)$$

wherein:
Z is the distance between the metal sheet and the nozzle along the main ejection direction (E), Z being expressed in mm,
d is the average height of the outlet of the nozzle along with the running direction of the metal sheet in front of the nozzle, d being expressed in mm,
V is the running speed of the metal sheet in front of the nozzle, V being expressed in $m \cdot s^{-1}$,
P is the pressure of the wiping gas in the nozzle, P being expressed in $N \cdot m^{-2}$, and
$fO_2$ is the volume fraction of oxygen in the wiping gas. A metal sheet, part and land motor vehicle are also provided.

5 Claims, 1 Drawing Sheet

(51) Int. Cl.
| | |
|---|---|
| C23C 2/02 | (2006.01) |
| C23C 2/16 | (2006.01) |
| B32B 15/01 | (2006.01) |
| C23C 30/00 | (2006.01) |
| C23C 2/40 | (2006.01) |
| C23C 2/04 | (2006.01) |
| B32B 15/20 | (2006.01) |
| B32B 15/04 | (2006.01) |
| C23C 2/20 | (2006.01) |
| C23C 2/26 | (2006.01) |

(52) U.S. Cl.
CPC ............... *B32B 15/20* (2013.01); *C23C 2/02* (2013.01); *C23C 2/04* (2013.01); *C23C 2/16* (2013.01); *C23C 2/20* (2013.01); *C23C 2/26* (2013.01); *C23C 2/34* (2013.01); *C23C 2/40* (2013.01); *C23C 30/00* (2013.01); *C23C 30/005* (2013.01); *Y10T 428/12556* (2015.01); *Y10T 428/12569* (2015.01); *Y10T 428/12792* (2015.01); *Y10T 428/12799* (2015.01); *Y10T 428/12972* (2015.01); *Y10T 428/12979* (2015.01); *Y10T 428/12993* (2015.01); *Y10T 428/26* (2015.01); *Y10T 428/263* (2015.01); *Y10T 428/264* (2015.01); *Y10T 428/265* (2015.01)

(58) Field of Classification Search
CPC ......... C23C 2/04; C23C 30/00; C23C 30/005; B32B 15/013; B32B 15/043; B32B 15/04; B32B 15/20; Y10T 428/12792; Y10T 428/12799; Y10T 428/12972; Y10T 428/12979; Y10T 428/12993; Y10T 428/12556; Y10T 428/12569; Y10T 428/26; Y10T 428/263; Y10T 428/264; Y10T 428/265
See application file for complete search history.

(56) References Cited

U.S. PATENT DOCUMENTS

| 9,611,530 B2 | 4/2017 | Bello et al. | |
|---|---|---|---|
| 9,677,164 B2 | 6/2017 | Maalman et al. | |
| 2003/0219621 A1* | 11/2003 | Sodani | B24C 1/06 428/659 |
| 2004/0258949 A1* | 12/2004 | Honda | B32B 15/013 428/659 |
| 2011/0111255 A1 | 5/2011 | Diez et al. | |
| 2012/0052206 A1* | 3/2012 | Diez | C23C 2/06 427/331 |
| 2012/0107636 A1 | 5/2012 | Diez et al. | |

FOREIGN PATENT DOCUMENTS

| JP | 57203761 A | 12/1982 |
|---|---|---|
| JP | 07316763 A | 12/1995 |
| JP | 2008214681 A | 9/2008 |
| JP | 4253998 B2 | 4/2009 |
| JP | 5588502 B2 | 9/2014 |
| JP | 5677289 B2 | 2/2015 |
| KR | 1020010112968 A | 12/2001 |
| KR | 100625952 B1 | 9/2006 |
| KR | 101419585 B1 | 7/2014 |
| RU | 2384648 C2 | 3/2010 |
| WO | 2007048895 A1 | 5/2007 |
| WO | 2008053273 A1 | 5/2008 |
| WO | 2010130883 A1 | 11/2010 |
| WO | 2010130884 A1 | 11/2010 |

OTHER PUBLICATIONS

English Abstract of JP4253998 (Apr. 15, 2009).
English Abstract of JPH07316763 (Dec. 5, 1995).
English Abstract of KR100625952 (Sep. 20, 2006).
Abstract of JP2008214681(Sep. 18, 2008).
Y.Zhang et al., "Influence of Air-Knife Wiping on Coating Thickness in Hot-Dip Galvanizing", Journal of Iron and Steel Research. International. 2012. 19(6): 7078.
M.Dubois et al., "Maximum Line Speed With a Minimum Coating Weight, Where is the Limit?", 8th International Conference on Zinc and Zinc Alloy Coated Steel Sheet, 2011.
S.Ekambi-Pokossi, "Caracterisation et Identification Multi-echelle de la Signature Peinture", (2005) (English translation riot currently available).
S,Ekambi-Pokossi, "Caracterisation et Identification Multi-echelle de la Signature Peinture", (2005) (See English Abstract submitted herewith).

\* cited by examiner

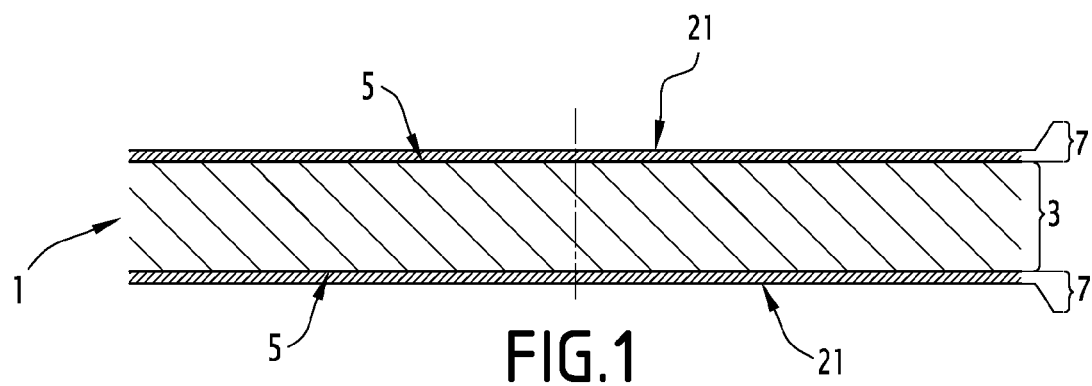
FIG.1
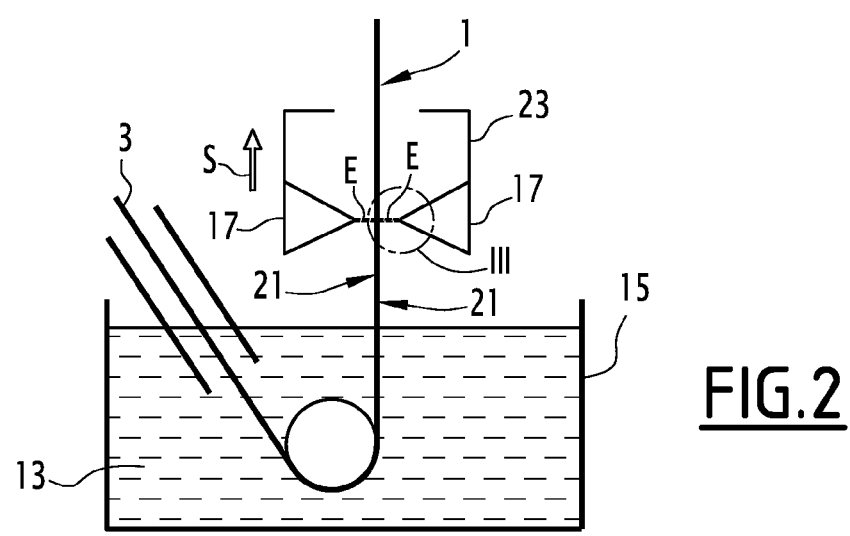
FIG.2
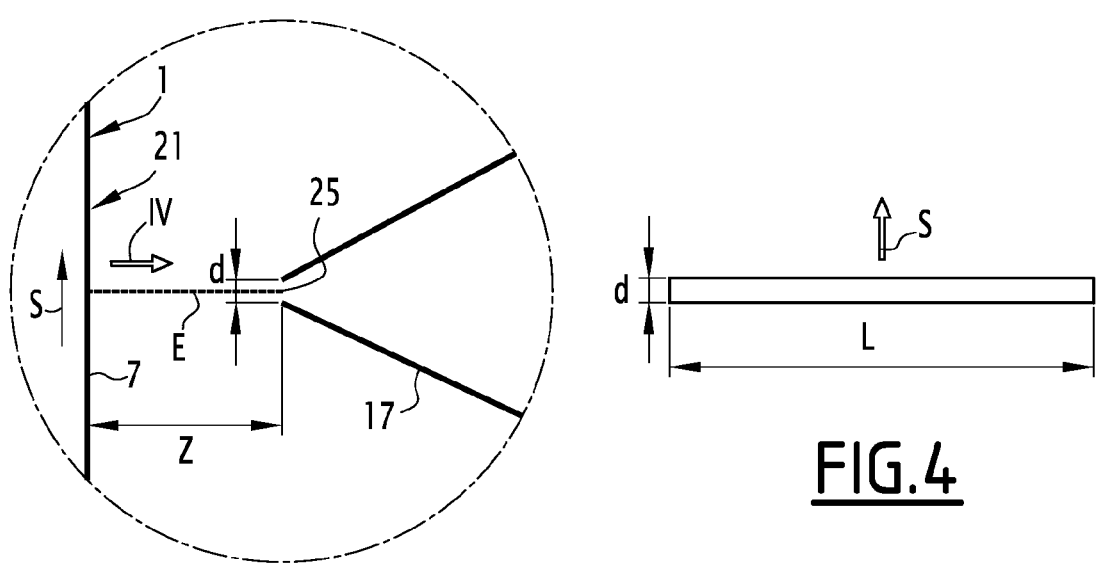
FIG.3
FIG.4

METAL SHEET WITH A ZNAL COATING

BACKGROUND

The present invention relates to a method for making a metal sheet comprising a steel substrate, at least one face of which is coated with a metal coating comprising Al, the remainder of the metal coating being Zn and inevitable impurities.

Such a metal sheet is more particularly intended for making body parts for a land motor driven vehicle such as an automobile.

The metal sheet is then cut out and deformed in order to form the body parts or the body.

This body is then coated with a film of paint (or paint system) which ensures a good aspect of the surface and participates with the metal coating based on zinc, in protection against corrosion.

Coatings based on zinc of metal sheets have what is called a waviness of their outer surfaces, which can presently only be compensated by significant thicknesses of paint, under the penalty of having a so-called "orange peel" aspect, unacceptable for body parts.

The waviness W of the outer surface of a coating is a smooth pseudo-periodic geometrical irregularity with quite long wavelength (0.8 to 10 mm) which is distinguished from roughness R which corresponds to geometrical irregularities with short wavelengths.

SUMMARY OF THE INVENTION

In the present invention, the arithmetic mean Wa of the waviness profile, expressed in µm, was retained for characterizing the waviness of the outer surface of a metal sheet coating, and the waviness is measured with 0.8 mm a cut-off threshold and designated by $Wa_{0.8}$.

A reduction in the waviness $Wa_{0.8}$ may allow reduction of the thickness of the paint film used for attaining a given property of paint aspect or, for constant thickness of the paint film, an improvement in the quality of the paint aspect.

The present invention provides a method for making a metal sheet, comprising a substrate, for which at least one face was coated by dip coating with a metal coating based on zinc and comprising between 0.2 and 0.7% by weight of Al, the outer surface of the metal coating having reduced waviness $Wa_{0.8}$.

For this purpose, the present invention provides a method for manufacturing a metal sheet comprising a steel substrate at least one face of which is coated with a metal coating comprising Al, the remainder of the metal coating being Zn, inevitable impurities and optionally one or more additional elements selected from Si, Sb, Pb, Ti, Ca, Mn, Sn, La, Ce, Cr, Zr or Bi, the weight content of each additional element in the metal coating being less than 0.3%, the metal coating having a weight content of aluminum comprise between 0.2 and 0.7%. The method comprising the steps of providing the substrate, depositing a metal coating on at least one face by dipping the substrate in a bath for obtaining the metal sheet, wiping the metal coating with at least one nozzle projecting through at least one outlet a wiping gas on the metal coating, the metal sheet running in front of the nozzle, the wiping gas being ejected from the nozzle along a main ejection direction E and solidifying the metal coating. The outer surface of the metal coating has, after solidification and before an optional skin-pass operation, a waviness $Wa_{0.8}$ of less than or equal to 0.55 µm. At least one of the following equations is satisfied in the method:

$$\frac{Z}{d} + 18\ln\left(\frac{Z}{d}\right) < 8\ln\left(\frac{P}{V}\right) - 27.52 \quad \text{(A)}$$

$$fO_2 < \frac{2.304 \cdot 10^{-3}}{\left(27.52 + \frac{Z}{d} + 8\ln\left(\frac{V}{P}\left(\frac{Z}{d}\right)^{2.25}\right)\right)^2} \quad \text{(B)}$$

wherein:
Z is the distance between the metal sheet 1 and the nozzle along the main ejection direction E, Z being expressed in mm,
d is the average height of the outlet of the nozzle along the running direction S of the metal sheet in front of the nozzle, d being expressed in mm,
V is the running speed of the metal sheet in front of the nozzle, V being expressed in m·s$^{-1}$,
P is the pressure of the wiping gas in the nozzle, P being expressed in N·m$^{-2}$, and
$fO_2$ is the volume fraction of oxygen in the wiping gas.

The method may also comprise the following features, taken individually or as a combination:

the waviness $Wa_{0.8}$ of the outer surface of the metal coating (7) after solidification and before an optional skin-pass operation is less than or equal to 0.35 µm;

before the deposition step, a step for cold rolling the metal sheet, at least the last pass being achieved with rectified and non-etched work rolls for which the work surfaces have a roughness $Ra_{2.5}$ of less than or equal to 0.5 µm;

a step for a skin-pass of the metal sheet with EDT work rolls, the working surfaces of which have a roughness $Ra_{2.5}$ comprises between 2.05 and 2.95 µm;

a step for skin-pass of the metal sheet with EBT work rolls, the working surfaces of which have a roughness $Ra_{2.5}$ comprised between 2.90 and 4.10 µm;

satisfying at least one of the following equations:

$$\frac{Z}{d} + 18\ln\left(\frac{Z}{d}\right) < 8\ln\left(\frac{P}{V}\right) - 36.32 \quad \text{(C)}$$

$$fO_2 < \frac{2.304 \cdot 10^{-3}}{\left(36.32 + \frac{Z}{d} + 8\ln\left(\frac{V}{P}\left(\frac{Z}{d}\right)^{2.25}\right)\right)^2}; \quad \text{(D)}$$

the metal coating has a weight content of aluminum less than or equal to 0.6%; and
the metal coating has a weight content of aluminum less than or equal to 0.5%.

The present invention also provides a metal sheet comprising a steel substrate, at least one face of which is coated with a metal coating comprising Al, the remainder of the metal coating being Zn, inevitable impurities and optionally one or more additional elements selected from among Si, Sb, Pb, Ti, Ca, Mn, Sn, La, Ce, Cr, Zr or Bi, the weight content of each additional element in the metal coating being less than 0.3%, the metal coating having a weight content of aluminum comprise between 0.2 and 0.7%, the outer surface of the metal coating having a waviness $Wa_{0.8}$, before an optional skin-pass operation, of less than or equal to 0.35 µm.

The metal sheet may have a metal coating that has a weight content of aluminum less than or equal to 0.6% and preferably less than or equal to 0.5%.

The present invention further provides a part obtained by deformation of a metal sheet according to the present invention, wherein an outer surface of the metal coating has a waviness $Wa_{0.8}$ of less than or equal to 0.43 μm.

The part may include a waviness of the outer surface of the metal coating that is $Wa_{0.8}$ less than or equal to 0.41 μm or preferably less than or equal to 0.37 μm.

The part may include a film of paint on the metal coating. The film of paint may be less than or equal to 120 μm, or preferably less than or equal to 100 μm.

The present invention provides a land motor vehicle comprising a body, the body comprising a part according to present invention.

BRIEF DESCRIPTION OF THE FIGURES

The invention will be illustrated by examples given as an indication, and not as a limitation, and with reference to the appended figures wherein:

FIG. 1 is a schematic sectional view illustrating the structure of a metal sheet according to the present invention, FIG. 2 is a schematic side view illustrating a tank and wiping nozzles for making the metal sheet of FIG. 1, FIG. 3 is a partial, schematic and enlarged view of the circled portion III of FIG. 2, and FIG. 4 is a schematic view taken along the arrow IV of FIG. 3, and illustrating the shape of the output of the nozzle of FIG. 3.

DETAILED DESCRIPTION

The metal sheet 1 of FIG. 1 comprises a steel substrate 3 coated on each of its two faces 5 with a metal coating 7.

It will be observed that the relative thicknesses of the substrate 3 and of the different layers of coating have not been observed in FIG. 1 in order to facilitate the illustration.

The coatings 7 present on both faces 5 are similar and only one will be described in detail subsequently. Alternatively, only one of the faces 5 has a coating 7.

The coating 7 generally has a thickness of less than or equal to 25 μm and aims at protecting the substrate 3 against corrosion.

The coating 7 comprises zinc and aluminum. The aluminum weight content of the metal coating 7 is comprised between 0.2 and 0.7%, preferably between 0.2 and 0.6%, and still more preferably between 0.2 and 0.5%. As indicated below, the limits of these aluminum content ranges are greater than those of the bath used for making the coating 7. This is explained by the formation of intermetallic substances at the junction between the substrate 3 and the coating 7 which leads to an increase in the aluminum content in the coating 7.

For making the metal sheet 1, it is possible for example to proceed as follows.

A substrate 3 as a strip obtained for example by hot and then cold-rolling is used.

Preferably, for cold-rolling, one starts by cold-rolling the substrate 3 with a reduction rate generally comprised between 60 and 85%, so as to obtain a substrate 3 with a thickness for example comprised between 0.2 and 2 mm.

In a preferred embodiment, one makes sure that at least the last cold-rolling pass is carried out with so-called "smooth" work rolls, i.e. rectified and non-etched rolls, for which the work surfaces have a roughness $Ra_{2.5}$, i.e. measured with a cut-off threshold at 2.5 mm, less than 0.5 μm.

It is recalled that work rolls are the rolls of the rolling mill directly in contact with the substrate 3 for ensuring its deformation. One refers, with the term of work surface, to their surfaces in contact with the substrate 3.

The smooth work rolls will be present at least in the last cage(s) of the rolling mill when the running direction of the substrate 3 in the rolling mill is considered.

The use of smooth work rolls at least for the last pass gives the possibility of better controlling the waviness $Wa_{0.8}$ of the metal sheet 1 obtained subsequently by coating of the substrate 3 on the one hand and parts which may be produced by deforming the metal sheet 1 on the other hand.

In particular, such cold-rolling allows reduction in the waviness $Wa_{0.8}$ as compared with rolling only resorting to rolls with stronger roughness, etched either by shot-blasting, or by an electric discharge (so-called Electron Discharge Texture (EDT) rolls), or further by an electron beam (so-called Electron Beam Texture (EBT) rolls).

The cold-rolled substrate 3 may then be subject to annealing conducted in a conventional way in an annealing oven under a reducing atmosphere, with view to recrystallization after the work hardening which it has undergone during the cold-rolling operation.

Recrystallization annealing further gives the possibility of activating the faces 5 of the substrate 3 so as to promote the chemical reactions required for the subsequent dip-coating operation.

Depending on the grade of the steel, the recrystallization annealing is carried out at a temperature comprised between 650 and 900° C., for example, for a period required for recrystallization of the steel and for activation of the faces 5.

The substrate 3 is then cooled to a temperature close to that of a bath 13 contained in a tank 15.

The composition of the bath 13 is based on zinc and contains between, for example, 0.1 and 0.5% by weight of aluminum, preferably between 0.1 and 0.4%, and still preferably between 0.1 and 0.3%.

The composition of the bath 13 may also contain up to 0.3% by weight of optional addition elements such as Si, Sb, Pb, Ti, Ca, Mn, Sn, La, Ce, Cr, Ni, Zr or Bi.

These different elements may inter alia allow improvement in the resistance to corrosion of the coating or else its brittleness or its adhesion, for example.

One skilled in the art who is aware of their effects on the characteristics of the coating will know how to use them according to the sought additional purpose. It was also checked that these elements did not interfere with controlling the waviness obtained by the method according to the invention.

Finally, the bath 13 may contain inevitable impurities from ingots for feeding the tank or else further from the passage of the substrate 3 in the bath 13. Mention may thus be notably made of iron.

After passing in the bath 13, the substrate 3 is coated on its two faces 5 with the coating 7 for obtaining the metal sheet 1.

As illustrated by FIG. 2, the metal sheet 1 is then subject to wiping by means of nozzles 17 placed on either side of the metal sheet 1 and which project a wiping gas, for example air or an inert gas, towards the outer surfaces 21 of the coating 7. The wiping gas is ejected from each nozzle 17 along a main ejection direction E. The main ejection directions E of each nozzle 17 are materialized in dotted lines in FIGS. 2 and 3.

In the illustrated example, the directions E are horizontal and orthogonal to the metal sheet 1. In other embodiments, the directions E may have other inclinations relative to the metal sheet 1.

The running speed V of the substrate 3 on the production line used and therefore in front of the nozzle 17 is generally comprised between, for example, 80 m/min and 300 m/min, and it is preferably greater than 120 m/min, or even 150 m/min.

In order to limit oxidation of the coating 7, provision may be made for a confinement box 23 for confining the atmosphere around the metal sheet 1 downstream from the nozzle 17. The term of downstream is meant here relatively to the running direction S of the metal sheet 1 facing the nozzles 17.

The confinement box 23 may alternatively be extended upstream as far as the surface of the bath 13 or as far as an intermediate position between the nozzle 17 and the surface of the bath 13.

In certain alternatives, the installation may not comprise any confinement box.

In the example described above, the nozzle 17 has structures, positions relative to the metal sheet 1 which are similar and they operate with similar adjustments. Thus, only the right nozzle 17 of FIG. 2 will be described below, with reference to FIG. 3.

Alternatively, the nozzle 17 may have different structures, different positions and/or operate with different adjustments. It is also possible to only provide a nozzle on one side of the metal sheet 1.

The nozzle 17 has an outlet 25 through which the wiping gas is ejected towards the outer surface 21 of the coating 7 placed opposite. Various outer shapes may be contemplated for the nozzle 17.

The outlet 25 of the nozzle 17 is positioned at a distance Z from the metal sheet 1 along the main ejection direction E. As illustrated by FIG. 4, the outlet 25 generally appears as a slot which extends, perpendicularly to the running direction S and to the plane of FIG. 3, over a width L at least equal to the width of the metal sheet 1.

Generally, the height of the outlet 25, i.e. its dimension parallel to the running direction S of the metal sheet 1 in front of the nozzle 17, is constant as illustrated by FIG. 4. This being the case, in certain alternatives, this height may vary over the width of the outlet 25. Thus, the outlet 25 may have for example a slightly flared shape towards its end (shape of a bowtie).

In order to take into account these possible height variations and the different possible embodiments, the average height d of the outlet 25 on its width L will be considered subsequently.

The pressure of the wiping gas in the nozzle 17 is noted as P and the volume fraction of oxygen in the wiping gas is noted as $fO_2$.

According to the invention, at least one of the following equations is observed:

$$\frac{Z}{d} + 18\ln\left(\frac{Z}{d}\right) < 8\ln\left(\frac{P}{V}\right) - 27.52 \quad (A)$$

$$fO_2 < \frac{2.304 \cdot 10^{-3}}{\left(27.52 + \frac{Z}{d} + 8\ln\left(\frac{V}{P}\left(\frac{Z}{d}\right)^{2.25}\right)\right)^2} \quad (B)$$

wherein:
Z is expressed in mm
d is expressed in mm
V is expressed in m·s$^{-1}$
P is expressed in N·m$^{-2}$ In other words, if equation (A) is not observed, equation (B) has to be observed and vice versa. The equations (A) and (B) may also be observed simultaneously.

Generally, the parameters V and d are imposed by the production line used. Therefore, there only remains Z and P or even $fO_2$, to be adjusted for meeting the requirements above.

Parameters thus set give the possibility of attaining, after solidification of the coating 7 and before a possible skin-pass, a waviness $Wa_{0.8}$ of less than or equal to 0.55 µm as illustrated by Example 1 below.

Still more advantageously, at least one of the following equations is observed:

$$\frac{Z}{d} + 18\ln\left(\frac{Z}{d}\right) < 8\ln\left(\frac{P}{V}\right) - 36.32 \quad (C)$$

$$fO_2 < \frac{2.304 \cdot 10^{-3}}{\left(36.32 + \frac{Z}{d} + 8\ln\left(\frac{V}{P}\left(\frac{Z}{d}\right)^{2.25}\right)\right)^2} \quad (D)$$

wherein:
Z is expressed in mm
d is expressed in mm
V is expressed in m·s$^{-1}$
P is expressed in N·m$^{-2}$ In other words, if equation (C) is not observed, equation (D) must be observed and vice versa. The equations (C) and (D) may also be observed simultaneously.

If the parameters Z, d, V, P and $fO_2$ satisfy equation (C) and/or equation (D) then, after solidification of the coatings 7 and before a possible skin-pass, a waviness $Wa_{0.8}$ of less than or equal to 0.35 µm is attained.

The coatings 7 are then left to cool in a controlled way so that they solidify.

As indicated earlier, at the end of this cooling operation 7 the outer surfaces 21 of the coating 7 have waviness values $Wa_{0.8}$ of less than 0.55 µm, or even less than 0.35 µm.

Alternatively, brushing may be carried out in order to remove the coating 7 deposited on one face 5 so that only one of the faces 5 of the substrate 3 will finally be coated with a coating 7.

When the coatings 7 are completely cooled, the metal sheet 1 may undergo a skin-pass operation for giving texture to the outer surfaces 21 of the coating 7, facilitating subsequent forming process of the metal sheet 1.

Indeed, the skin-pass operation gives the possibility of transferring to the outer surfaces 21 of the coating 7 of the metal sheet 1 sufficient roughness in order for its forming process to be properly carried out, while promoting good retention of the oil applied on the metal sheet 1 before it is formed. The elongation rate of the metal sheet 1 during the skin-pass operation is generally comprised between 0.5 and 2%.

Preferably, the skin-pass operation will give the possibility of keeping a waviness $Wa_{0.8}$ of less than 0.55 µm and preferably less than 0.35 µm for the outer surfaces 21 of the coating 7.

In a first alternative, the skin-pass operation will be carried out with EDT work rolls for which the work surfaces have a roughness $Ra_{2.5}$ comprised between 2.05 and 2.95 µm. If the elongation rate during the skin-pass operation is less than or equal to 1.1%, the roughness $Ra_{2.5}$ of the work surfaces of the EDT work rolls will preferably be comprised between 2.50 and 2.95 µm. If the elongation rate during the skin-pass operation is greater than or equal to 1.1%, the roughness $Ra_{2.5}$ of the work surfaces of the EDT work rolls will preferably be comprised between 2.05 and 2.50 µm.

In another alternative, the skin-pass operation will be carried out with EBT work rolls for which the work surfaces have a roughness $Ra_{2.5}$ comprised between 2.90 and 4.10 µm. If the elongation rate during the skin-pass operation is less than or equal to 1.1%, the roughness $Ra_{2.5}$ of the work surfaces of the EBT work rolls will preferably be comprised between 3.50 and 4.10 µm. If the elongation rate during the skin-pass operation is greater than or equal to 1.1%, the roughness $Ra_{2.5}$ of the work surfaces of the EBT work rolls will preferably be comprised between 2.90 and 3.50 µm.

The skin-pass operation is generally carried out for a metal sheet 1 intended for manufacturing body parts for automobiles.

When the metal sheet 1 is intended for manufacturing domestic electric appliances, for example this additional operation is not carried out.

The metal sheet 1 having been skin-passed or not may then be cut out and then undergoes a forming process, for example by drawing, bending or profiling, in order to form a part which may then be painted in order to form, on each coating 7 a paint film (or a paint system).

In the case of parts for domestic electrical appliances, it is also possible to possibly subject the paint films to annealing with physical and/or chemical means, known per se.

For this purpose, it is possible to have the painted part pass through a hot air or induction oven, or further under UV lamps or under a device diffusing electron beams.

After deformation, the outer surfaces of the coating 7 of the part have a waviness $Wa_{0.8}$ of less than or equal to 0.60 µm, or even less than or equal to 0.45 µm, or even less than or equal to 0.43 µm, or even 0.41 µm or even further 0.37 µm.

This waviness may for example be measured after 3.5% equi-biaxial deformation.

Controlling the waviness $Wa_{0.8}$ before a possible skin-pass and after a possible skin-pass to values of less than or equal to 0.55 µm, respectively 0.35 µm, as described above, allows control of the waviness $Wa_{0.8}$ after deformation to values of less than or equal to 0.60 µm, respectively 0.45 µm, 0.43 µm, 0.41 µm or even 0.37 µm.

For automotive applications, after phosphate-coating, each part is dipped in a cataphoresis bath, and a primer paint layer, a base paint layer, and optionally a finishing varnish layer are applied in succession.

Before applying the cataphoresis layer on the part, the latter is degreased beforehand and then phosphate-coated so as to ensure the adherence of the cataphoresis.

The cataphoresis layer provides the part with additional protection against corrosion. The primer paint layer, generally applied with a gun, prepares the final appearance of the part and protects it against stone chipping and against UVs. The base paint layer gives the part its color and its final appearance. The varnish layer imparts to the surface of the part, good mechanical strength, resistance against aggressive chemical agents and a good surface aspect.

Generally, the weight of the phosphate coating layer is comprised between 1.5 and 5 g/m².

The paint films applied for protecting and guaranteeing an optimum surface aspect to the parts, for example comprise a cataphoresis layer with a thickness from 15 to 25 µm, a coat of primer paint with a thickness from 35 to 45 µm, and a base coat of paint with a thickness from 40 to 50 µm.

In the cases when the paint films further comprise a varnish layer, the thicknesses of the different paint layers are generally the following:

cataphoresis layer: between 15 and 25 µm, preferably less than 20 µm,
primer paint layer: less than 45 µm,
base paint layer: less than 20 µm, and
varnish layer: less than 55 µm.

The paint films may also not comprise any cataphoresis layer, and only comprise a primer paint layer and a base paint layer and optionally a varnish layer.

Preferably, the total thickness of the paint films will be less than 120 µm or even 100 µm.

The invention will now be illustrated by tests given as an indication and not as a limitation.

Example 1—Influence of the Volume Fraction $fO_2$

The tests conducted in this example aim at showing the positive influence of observing equations (A) and/or (B), or even (C) and/or (D).

The table I below details the conditions of a series of tests conducted with different values of Z, d, V, P and $fO_2$ and provides the wavinesses $Wa_{0.8}$ measured before a skin-pass, NSKP meaning not having been skin-passed.

The procedure for measuring the waviness $Wa_{0.8}$ consists of acquiring by mechanical probing (without any shoe) a metal sheet profile with a length of 50 mm, at 45° from the rolling direction. From the signal obtained by probing, the approximation of its general shape with a polynomial of a degree of at least 5 is subtracted. The waviness Wa and the arithmetic mean roughness Ra is then separated by a Gaussien filter by applying a cut-off of 0.8 mm.

The right columns specify for each test, whether the parameters satisfy the equations (A), (B), (C) and (D).

TABLE I

| Tests | Z (mm) | d (mm) | V (m/min) | P (N/m2) | $fO_2$ | $Wa_{0.8}$ NSKP (µm) | Eq (A) | Eq (B) | Eq (C) | Eq (D) |
|---|---|---|---|---|---|---|---|---|---|---|
| 1 | 9 | 1.2 | 150 | 38800 | 0.21 | 0.36 | yes | yes | no | no |
| 2 | 11 | 1.2 | 150 | 48200 | 0.21 | 0.47 | yes | yes | no | no |
| 3 | 7 | 1.2 | 150 | 26300 | $1.10^{-4}$ | 0.27 | yes | yes | yes | yes |
| 4 | 9 | 1.2 | 150 | 38800 | $1.10^{-4}$ | 0.31 | yes | yes | no | yes |
| 5 | 13 | 1.2 | 150 | 59000 | $1.10^{-4}$ | 0.44 | no | yes | no | no |
| 6 | 8 | 1 | 120 | 33100 | 0.21 | 0.43 | yes | yes | no | no |
| 7 | 10 | 1 | 120 | 40700 | 0.21 | 0.50 | yes | yes | no | no |
| 8 | 14 | 1 | 120 | 60900 | 0.21 | 0.84 | no | no | no | no |
| 9 | 6.5 | 1 | 120 | 32600 | $1.10^{-4}$ | 0.31 | yes | yes | yes | yes |
| 10 | 10 | 1 | 120 | 52000 | $1.10^{-4}$ | 0.41 | yes | yes | no | no |
| 11 | 14 | 1 | 120 | 64900 | $1.10^{-4}$ | 0.66 | no | no | no | no |
| 12 | 8 | 1.5 | 100 | 22400 | $1.10^{-4}$ | 0.31 | yes | yes | yes | yes |
| 13 | 15 | 1.5 | 100 | 40800 | $1.10^{-4}$ | 0.37 | yes | yes | no | no |

Thus, the use of parameters satisfying equation (A) and/or (B) gives the possibility of attaining waviness values before a skin-pass $Wa_{0.8}$ of less than 0.55 μm.

The use of parameters satisfying equation (C) and/or (D) gives the possibility of attaining wavinesses before a skin-pass $Wa_{0.8}$ still smaller and less than or equal to 0.35 μm.

Waviness values before any skin-pass $Wa_{0.8}$ of less than or equal to 0.35 μm may in certain cases be reached without observing equations (C) and/or (D), notably by observing equations (A) and/or (B) and by using smooth work rolls for the cold-rolling and/or of a particular roughness for the skin-pass, as discussed below.

Example 2—Influence of Cold-Rolling with Smooth Work Rolls

The tests conducted in this example aim at showing the positive influence of cold-rolling carried out with smooth work rolls, as compared with rolling carried out with EDT work rolls, the work surface of which have a greater roughness.

For this purpose, steel substrates are subject to cold-rolling in order to attain a thickness of 0.8 mm, either by using so-called smooth work rolls, the work surfaces of which have a roughness $Ra_{2.5}$ of 0.5 μm, or EDT work rolls for which the work surfaces have a roughness $Ra_{2.5}$ of 3 μm. The substrates 3 are then coated with a zinc coating by hot dip coating in a zinc bath comprising 0.18% by weight of aluminum, for which the temperature is 460° C., and are wiped with nitrogen so as to form a zinc coating having a thickness of 6.5 μm.

After complete cooling of the thereby obtained metal sheet 1, the latter are subject to a skin-pass operation conducted with EBT etched work rolls, the work surfaces of which have a roughness $Ra_{2.5}$ of 5 μm, before being cut out and formed by drawing.

The waviness values $Wa_{0.8}$ of the outer surfaces 21 of the coating 7 are measured at the end of each of the steps of the method, i.e. after cold-rolling (CR), after the skin-pass operation (SKP) and after forming (DEF). The latter is carried out by equi-biaxial deformation of 3.5% with a Marciniak tool.

The results of the measurements of $Wa_{0.8}$ are grouped in table II.

As may be seen, the use of smooth rolling allows reduction in the waviness $Wa_{0.8}$ regardless whether this is at the end of the cold-rolling, of the skin-pass or of the forming step.

TABLE II

| Tests | $Ra_{2.5}$ (μm) work rolls CR | $Wa_{0.8}$ (μm) after CR | $Wa_{0.8}$ (μm) after SKP | $Wa_{0.8}$ (μm) after DEF | Eq (A) | Eq (B) | Eq (C) | Eq (D) |
|---|---|---|---|---|---|---|---|---|
| 14 | 3 | 0.52 | 0.39 | 0.41 | yes | yes | no | no |
| 15 | 0.5 | 0.15 | 0.35 | 0.34 | yes | yes | no | no |

Example 3—Influence of the Skin-Pass

The tests carried out in this example aim at ensuring the positive influence of a skin-pass carried out by using work rolls, for which the work surfaces have a certain roughness $Ra_{2.5}$.

For this purpose, steel substrates 3 were subject to cold-rolling in order to form cold-rolled substrates for which the thickness is 0.7 mm.

The substrates 3 are then coated with a zinc coating by hot dip coating in a zinc bath comprising 0.18% by weight of aluminum, the temperature of which is 460° C., and are dried with nitrogen in order to form zinc coatings having a thickness of 6.5 μm.

The thereby obtained metal sheets 1 are divided into two batches.

Before being formed by equi-biaxial deformation of 3.5% with a Marciniak tool, the metal sheets 1 from the first batch are subject to a skin-pass carried out with EDT work rolls and with an elongation rate of 1.4%. The roughness $Ra_{2.5}$ of the work surfaces is 2.20 μm.

The metal sheets 1 from the second batch are subject to a skin-pass operation with the same elongation rate but with EDT etched work rolls, for which the work surfaces have a roughness $Ra_{2.5}$ of 2.60 μm.

The results of the tests are grouped in table III.

TABLE III

| Tests | $Ra_{2.5}$ (μm) work rolls SKP | $Wa_{0.8}$ (μm) after CR | $Wa_{0.8}$ (μm) after SKP | $Wa_{0.8}$ (μm) after DEF | Eq (A) | Eq (B) | Eq (C) | Eq (D) |
|---|---|---|---|---|---|---|---|---|
| 16 | 2.20 | 0.42 | 0.28 | 0.37 | yes | yes | no | no |
| 17 | 2.60 | 0.42 | 0.41 | 0.47 | yes | yes | no | no |

What is claimed is:

1. A coated metal sheet comprising:
   a steel substrate having at least one face; and
   a metal coating the at least one face of the substrate, the metal coating being deposited by dipping the steel substrate in a dip bath;
   the metal coating comprising between 0.2 and 0.7% by weight of Al, a remainder of the metal coating being Zn and inevitable impurities,
   wherein the coated metal sheet was not subjected to a skin pass operation after coating and wherein an outer surface of the metal coating has a waviness $Wa_{0.8}$ of less than or equal to 0.35 μm.

2. The coated metal sheet according to claim 1, wherein the metal coating further includes one or more additional elements selected from the following: Si, Sb, Pb, Ti, Ca, Mn, Sn, La, Ce, Cr, Zr or Bi, a weight content of each additional element in the metal coating being less than 0.3%.

3. The coated metal sheet according to claim 1, wherein the metal coating has a weight content of aluminum less than or equal to 0.6%.

4. The coated metal sheet according to claim 3, wherein the metal coating has a weight content of aluminum less than or equal to 0.5%.

5. The coated metal sheet according to claim 2, wherein the metal coating consists of Al; Zn; the one or more additional elements selected from the following: Si, Sb, Pb, Ti, Ca, Mn, Sn, La, Ce, Cr, Zr or Bi; and inevitable impurities.

* * * * *